United States Patent
Gieras

(10) Patent No.: US 11,081,947 B2
(45) Date of Patent: Aug. 3, 2021

(54) CLAW POLE BRUSHLESS SYNCHRONOUS MACHINE

(71) Applicant: Hamilton Sundstrand Corporation, Charlotte, NC (US)

(72) Inventor: Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 446 days.

(21) Appl. No.: 15/673,495

(22) Filed: Aug. 10, 2017

(65) Prior Publication Data

US 2019/0052158 A1 Feb. 14, 2019

(51) Int. Cl.
*H02K 19/24* (2006.01)
*H02K 19/26* (2006.01)
*H02K 1/24* (2006.01)

(52) U.S. Cl.
CPC ............. *H02K 19/24* (2013.01); *H02K 19/26* (2013.01); *H02K 1/243* (2013.01)

(58) Field of Classification Search
CPC ........ H02K 19/24; H02K 19/26; H02K 1/243; H02K 19/28; H02K 3/528; H02K 1/226; H02K 21/46
USPC .......................................................... 310/263
See application file for complete search history.

(56) References Cited

U.S. PATENT DOCUMENTS

| | | | |
|---|---|---|---|
| 3,321,652 A | 5/1967 | Opel | |
| 3,571,639 A * | 3/1971 | Tiltins | H02K 19/24 310/168 |
| 4,260,944 A * | 4/1981 | O'Mahony | H02K 16/02 310/111 |
| 7,915,783 B2 | 3/2011 | Popov | |
| 8,878,413 B2 | 11/2014 | Wolf et al. | |
| 8,987,967 B2 | 3/2015 | Cai et al. | |
| 2002/0180297 A1* | 12/2002 | Ifrim | H02K 21/14 310/168 |
| 2003/0137208 A1* | 7/2003 | York | H02K 3/528 310/194 |
| 2005/0006972 A1 | 1/2005 | Bradfield | |
| 2005/0258699 A1* | 11/2005 | Hsu | H02K 21/046 310/156.56 |
| 2006/0073050 A1* | 4/2006 | Iwanami | B60H 1/3223 418/3 |
| 2009/0120222 A1* | 5/2009 | Kimura | F16H 61/32 74/335 |

(Continued)

FOREIGN PATENT DOCUMENTS

| | | |
|---|---|---|
| DE | 1121716 | 1/1962 |
| DE | 1488353 | 6/1969 |
| JP | H04281358 | 10/1992 |

OTHER PUBLICATIONS

The Extended European Search Report for EP Application No. 18188093.1, dated Dec. 5, 2018.

*Primary Examiner* — Emily P Pham
(74) *Attorney, Agent, or Firm* — Carlson, Gaskey & Olds, P.C.

(57) ABSTRACT

A claw pole synchronous machine includes a housing and a rotor being rotatable relative to the housing and having a plurality of first claw poles circumferentially alternating with a plurality of second claw poles. The plurality of first claw poles are axially overlapping with the plurality of second claw poles. At least two DC excitation coils are fixed relative to the housing and configured to provide a magnetic field to the rotor. A stator is fixed to the housing.

19 Claims, 2 Drawing Sheets

(56) References Cited

U.S. PATENT DOCUMENTS

| | | | |
|---|---|---|---|
| 2009/0184601 A1* | 7/2009 | Dubus | H02K 3/28 |
| | | | 310/208 |
| 2015/0318755 A1* | 11/2015 | Bonnici | H02K 5/15 |
| | | | 310/90 |
| 2016/0040728 A1* | 2/2016 | Sakamoto | F16D 27/112 |
| | | | 192/84.96 |
| 2016/0197527 A1* | 7/2016 | Yamada | H02K 21/16 |
| | | | 310/156.21 |
| 2016/0294233 A1* | 10/2016 | Popov | H02K 1/243 |

* cited by examiner

CLAW POLE BRUSHLESS SYNCHRONOUS MACHINE

TECHNICAL FIELD

The present disclosure relates generally to synchronous machines, and more specifically to a claw pole brushless synchronous machine excluding a winding interior to the claw poles.

BACKGROUND

Claw pole synchronous machines are widely used as generators and integrated starter-generators (IDGs) in the automotive industry, as well as similar industries and applications. In a typical claw pole synchronous machine, an internal rotor includes claw type poles positioned around a field excitation winding. Mechanical rotation, such as from a shaft, drives rotation of the rotor within the synchronous machine. While energy is fed to the excitation winding an excitation field is created and rotation of the rotor generates electricity due to interaction of a generated rotating magnetic field and a stator winding exterior to the rotor. The excitation winding generally takes the form of a ring shaped coil. The stator winding of a claw pole synchronous machine is identical in form and function to the stator of any other type of synchronous machine and includes AC windings distributed in slots.

In conventional examples, the claw pole synchronous machines include a high number of poles on the rotor, due to the claw pole construction, thereby increasing the frequency output of the machine and consequently reducing the volume of the machine.

SUMMARY OF THE INVENTION

In one exemplary embodiment a claw pole synchronous machine includes a housing, a rotor being rotatable relative to the housing and having a plurality of first claw poles circumferentially alternating with a plurality of second claw poles, the plurality of first claw poles being axially overlapping with the plurality of second claw poles, at least two DC excitation coils fixed relative to the housing and configured to provide a magnetic field to the rotor, and a stator fixed to the housing being in operable communication with the rotor.

In another example of the above described claw pole synchronous machine the rotor comprises a first ferromagnetic disk, the first plurality of claw poles extending axially from a radially outer edge of the first ferromagnetic disk, and a second ferromagnetic disk, coaxial with the first ferromagnetic disk, the second plurality of claw poles extending from a radially outer edge of the second ferromagnetic disk.

In another example of any of the above described claw pole synchronous machines the housing defines a first magnetic flux path through the first ferromagnetic disk and interfaced with a first DC excitation coil, and defining a second magnetic flux path through the second ferromagnetic disk and interfaced with a second DC excitation coil.

In another example of any of the above described claw pole synchronous machines the housing includes a first end bell on a first axial end, a second end bell on a second axial end opposite the first end bell, and a radially outward yoke connecting the first end bell and the second end bell.

Another example of any of the above described claw pole synchronous machines further includes a first ferromagnetic plate extending from the first end bell axially toward the second end bell, such that the first magnetic flux path is extended through the first ferromagnetic disk.

Another example of any of the above described claw pole synchronous machines further includes a second ferromagnetic plate extending axially from the second end bell toward the first end bell, such that the second magnetic flux path is extended through the second ferromagnetic disk.

In another example of any of the above described claw pole synchronous machines the housing further defines a third magnetic flux path passing from the first end bell to the first ferromagnetic disc, from the first ferromagnetic disc to the stator winding, from the stator winding to the second ferromagnetic disc, from the second ferromagnetic disk to the second end bell, and from the second end bell to the first end bell.

In another example of any of the above described claw pole synchronous machines the rotor is characterized by an absence of a coil and an absence of permanent magnets.

Another example of any of the above described claw pole synchronous machines further includes a stator core disposed within the housing and radially outward of the rotor.

In another example of any of the above described claw pole synchronous machines the stator core is disposed axially between a first DC excitation coil and a second DC excitation coil of the at least two DC excitation coils.

In another example of any of the above described claw pole synchronous machines the rotor is mechanically connected to a shaft.

In another example of any of the above described claw pole synchronous machines the housing is disposed about the shaft, and interfaced with the shaft via at least one bearing assembly such that the housing is static relative to the shaft.

In another example of any of the above described claw pole synchronous machines the plurality of first claw poles and the plurality of second claw poles defines an air gap in a radial spacing between the corresponding pluralities of claw poles.

In another example of any of the above described claw pole synchronous machines a shaft protrudes through the air gap.

An exemplary method for generating electricity in a synchronous machine include generating a first DC excitation field using a first DC excitation coil, the first DC excitation coil being stationary relative to a housing, generating a second DC excitation field using a second DC excitation coil, the second DC excitation field opposing the first DC excitation field, and the second DC excitation coil being stationary relative to the housing, and interfacing a claw pole rotor assembly with the first and second DC excitation fields using a first end bell and a second end bell of a synchronous machine to direct the first and second DC excitation fields to a corresponding rotor disk of the claw pole rotor assembly.

In another example of the above described exemplary method for generating electricity in a synchronous machine the first DC excitation coil and the second DC excitation coil are positioned radially outward of the claw pole rotor assembly.

In another example of any of the above described exemplary methods for generating electricity in a synchronous machine generating the first excitation field using the first DC excitation coil comprises passing a DC current of a first polarity through the first DC excitation coil, and generating the second excitation field using the second DC excitation coil comprises passing a DC current of a second polarity through the second DC excitation coil, the second polarity being opposite the first polarity.

In another example of any of the above described exemplary methods for generating electricity in a synchronous machine using the first end bell and the second end bell of the synchronous machine to direct the first and second DC excitation fields to the corresponding rotor disk of the claw pole rotor assembly further comprises using a first ferromagnetic plate extending axially inward from the first end bell and a second ferromagnetic plate extending axially inward form the second end bell to direct the first and second DC excitation fields.

In another example of any of the above described exemplary methods for generating electricity in a synchronous machine the claw pole rotor assembly includes a first rotor disk and a second rotor disk, and wherein the claw pole rotor assembly is characterized by a lack of permanent magnets and a lack of excitation coils.

These and other features of the present invention can be best understood from the following specification and drawings, the following of which is a brief description.

DETAILED DESCRIPTION OF AN EMBODIMENT

Figure 1:
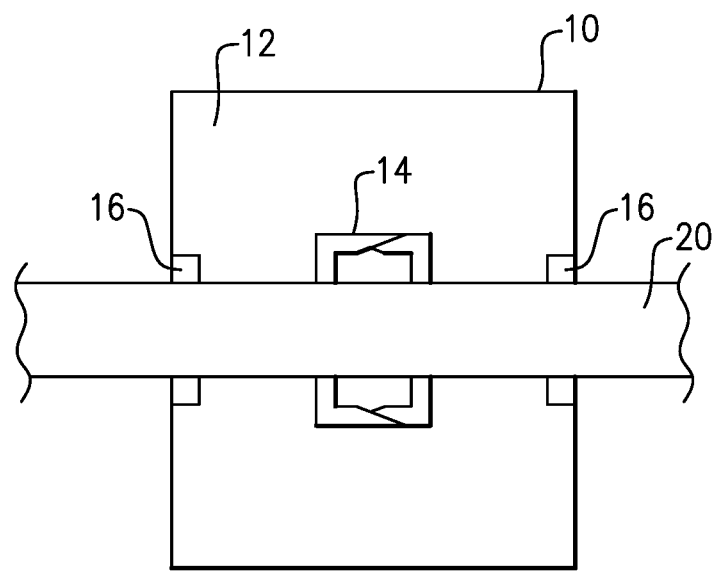
FIG. 1 illustrates a claw pole synchronous machine disposed about a shaft.

FIG. 1 schematically illustrates an exemplary claw pole synchronous machine 10 disposed about a shaft 20. The claw pole synchronous machine 10 includes a static portion 12 and a rotor portion 14. The static portion 12 is supported relative to the rotor portion 14 via multiple bearings 16. The bearings 16 allow the rotor portion 14 to rotate freely along with the shaft 20, while at the same time preventing the rotation from being translated from the shaft 20 to the static portion 12.

The rotor portion 14 is a claw pole type rotor, including two coaxial ferromagnetic rotor disks with interfaced ferromagnetic claw poles extending axially toward the other disk from a radially outward edge of the rotor disk. In some examples, the ferromagnetic rotor disks are connected to each other via a non-ferromagnetic bushing in order to ensure proper relative placement of the ferromagnetic rotor disks within the synchronous machine 10. In alternative examples, the ferromagnetic rotor disks may be attached directly to a shaft. The rotor portion 14 is described in greater detail below, with regards to FIG. 2.

Claw pole synchronous machines, such as the exemplary machine 10 of FIG. 1, require a rotor field excitation current to be passed through one or more excitation windings to produce a magnetic flux thereby enabling power generation. In existing systems, an excitation winding is disposed between the claw poles of the rotor portion and the bushing connecting the rotor disks. A direct current (DC) current is provided to the winding, thereby generating the excitation field and allowing the generation of electricity. The DC field current is generally delivered to the rotor along the bushing and through one of the rotor disks with the aid of either slip rings and brushes, a brushless exciter, or a rotary transformer. The additional components required to generate the excitation field increase the weight, volume and complexity of the synchronous machine and increase the frequency of required maintenance. Further, the excitation field winding disposed between the claw poles generates a substantial amount of heat within the rotor portion. The heat must then be removed using a coolant, or other active cooling system, in order to prevent damage to the synchronous machine.

Figure 2:
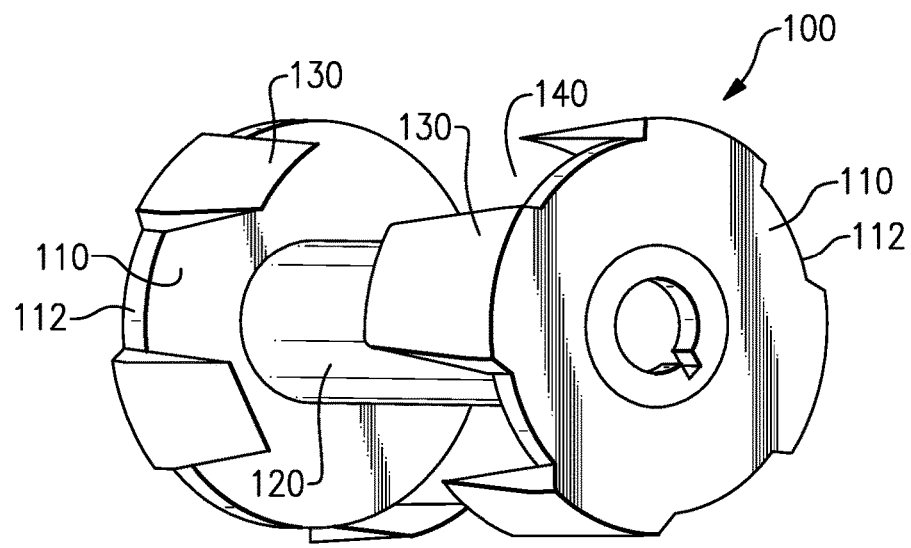
FIG. 2 schematically illustrates a claw pole rotor configuration for utilization in an exemplary claw pole synchronous machine.

FIG. 2 schematically illustrates an exemplary claw pole rotor 100, such as could be used for the rotor portion 14 of FIG. 1. The claw pole rotor 100 includes two ferromagnetic disks 110 each of which is connected to the other via a non-ferromagnetic bushing 120. The ferromagnetic disks 110 are oriented normal to an axis defined by the bushing 120 and are coaxial. At a radially outward edge 112 of each ferromagnetic disk 110 are multiple ferromagnetic claw poles 130 extending axially toward the other of the ferromagnetic disks 110 along the axis defined by the bushing 120.

While illustrated in the example of FIG. 2 as being spaced apart for explanatory purposes, one of skill in the art will understand that, in a practical example, the ferromagnetic claw poles 130 of each ferromagnetic disk 110 will interface with the ferromagnetic claw poles 130 of the other ferromagnetic disk 110 such that the ferromagnetic claw poles 130 axially overlap along the axis defined by the bushing 120.

The interfacing of the ferromagnetic claw poles 130 results in an alternating configuration where each ferromagnetic claw 130 is circumferentially adjacent to two ferromagnetic claw poles 130 of the other ferromagnetic disk 110. Defined between the ferromagnetic claw poles 130 is a volume referred to as an air gap 140. As implemented in the exemplary constructions of FIGS. 1 and 3, the only components passing through the air gap 140 are the shaft 20, 220 and the bushing 120. In other words, the rotor 100 is characterized by an absence of a coil and an absence of permanent magnets. The air gap 140 takes the place of the excitation winding of the conventional examples.

Figure 3:
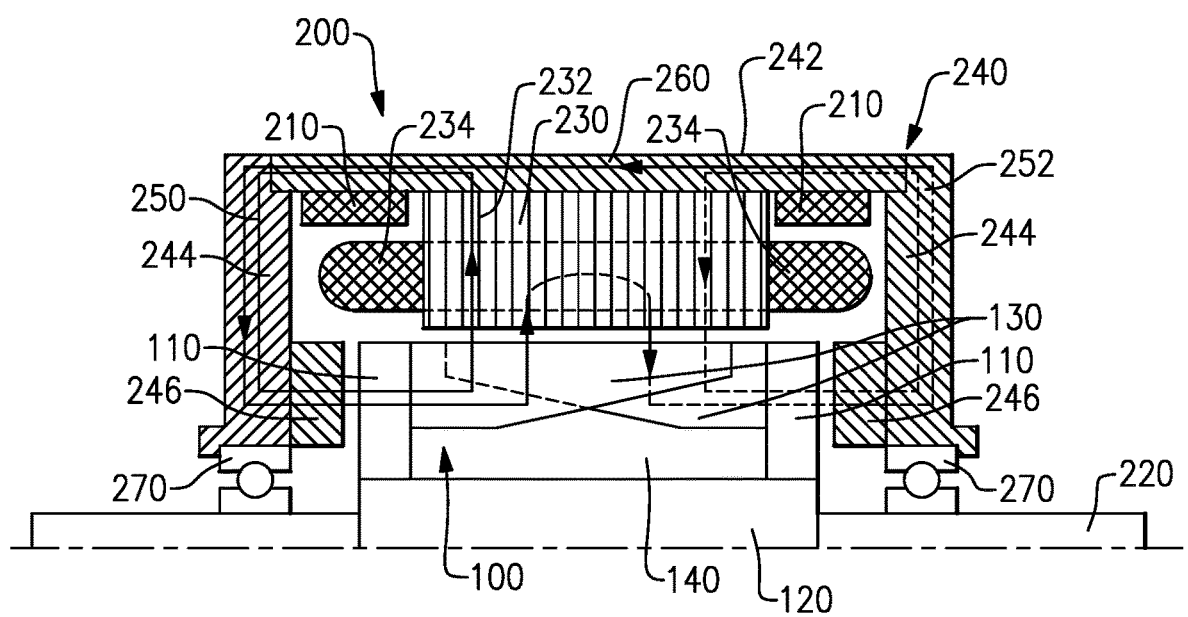
FIG. 3 schematically illustrates a cross section of the claw pole synchronous machine of FIG. 1.

With continued reference to FIGS. 1 and 2, FIG. 3 schematically illustrates a cross sectional view of an exemplary claw pole synchronous machine 200 including the claw pole rotor 100 of FIG. 2. The claw pole synchronous machine 200 is a brushless machine and includes two field excitation windings in the form of DC excitation coils 210 As the DC excitation coils 210 are at a radially outward edge of the static portion of the claw pole synchronous machine 200, a relatively simple DC current input connection can be utilized to provide the excitation current. A stack winding 230 is disposed axially between the DC excitation coils 210. The stack winding 230 includes a laminated or sintered powder core 232 and a multi-phase or single phase winding 234. The stack winding 230 interacts with a rotating flux field generated by the rotation of the claw pole rotor 100 to generate electricity according to known synchronous machine techniques.

The DC excitation coils 210 and the stack winding 230 are disposed within, and fixed relative to, a ferromagnetic housing 240. The ferromagnetic housing 240 includes a radially outward cylindrical yoke 242 connecting two axially opposite ferromagnetic end bells 244. Each of the ferromagnetic end bells 244 further includes a ferromagnetic plate 246 at a radially inward edge of the end bell 244. The ferromagnetic plates 246 extend axially toward the opposite ferromagnetic end bell 244, and further define an excitation flux path 250, 252. Each of the excitation flux paths 250, 252 surrounds, and interfaces with, a corresponding DC excitation coil 210, allowing the DC excitation coil 210 to magnetize a corresponding rotor disk.

The DC excitation coils 210 in the exemplary embodiment are ring-shaped coils disposed at each axial end of the stack winding 230. The DC excitation coils 210 magnetize the claw pole rotor 100 via the magnetization flux paths 250, 252 through the ferromagnetic end bells 244 and the ferromagnetic plates 246. In other words, the DC excitation coils 210 are configured to provide a magnetic field to the rotor.

The magnetization is achieved via the ferromagnetic housing elements 242, 244, 246 which defines the corresponding magnetic flux path 250, 252 that passes through a corresponding claw 130 of the claw pole rotor 100. In order to ensure that opposing flux paths 250, 252 are generated on each ferromagnetic disk 110, and thus opposing magnetic poles are generated by the ferromagnetic claw poles 130 of the claw pole rotor 100, a DC current provided to each of the excitation coils 210 is inverted relative to the DC current provided to the other excitation coil 210.

The magnetized claw poles 130 rotate along with the shaft 220. As the magnetized claw poles 130 rotate, the magnetic field interacts with the stator stack winding 230 to generate a third flux path 260. The third flux path 260 is a primary flux path and generates the output of the synchronous machine when the machine is operating in a generator mode.

As described above, with regards to the example of FIG. 1, the housing 240 is maintained in position relative to the shaft 220 by multiple bearing 270. The bearings 270 allow the shaft to rotate freely while the housing 240 maintains a static position.

In alternative examples, electrical energy may be provided to the stator stack winding 230, driving a flow along the primary flux path 260. If DC current is provided to the DC excitation coils 210 at the same time, then the claw pole rotor 100 can be driven to rotate, causing the synchronous machine to operate as a motor.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention clamied is:

1. A claw pole synchronous machine comprising:
   a housing;
   a rotor being rotatable relative to the housing and having a plurality of first claw poles circumferentially alternating with a plurality of second claw poles, the plurality of first claw poles being axially overlapping with the plurality of second claw poles;
   at least two DC excitation coils fixed relative to said housing and configured to provide a magnetic field to the rotor; and
   a stator fixed to the housing being in operable communication with the rotor.

2. The claw pole synchronous machine of claim 1, wherein the rotor comprises a first ferromagnetic disk, the first plurality of claw poles extending axially from a radially outer edge of the first ferromagnetic disk, and a second ferromagnetic disk, coaxial with the first ferromagnetic disk, the second plurality of claw poles extending from a radially outer edge of the second ferromagnetic disk.

3. A claw pole synchronous machine comprising:
   a housing defining a first magnetic flux path through a first ferromagnetic disk and interfaced with a first DC excitation coil, and defining a second magnetic flux path through a second ferromagnetic disk and interfaced with a second DC excitation coil;
   a rotor being rotatable relative to the housing and having a first plurality of claw poles circumferentially alternating with a second plurality of claw poles, the plurality of first claw poles being axially overlapping with the second plurality of claw poles, wherein the rotor comprises a first ferromagnetic disk, the first plurality of claw poles extending axially from a radially outer edge of the first ferromagnetic disk, and a second ferromagnetic disk, coaxial with the first ferromagnetic disk, the second plurality of claw poles extending from a radially outer edge of the second ferromagnetic disk;
   at least two DC excitation coils fixed relative to said housing and configured to provide a magnetic field to the rotor; and
   a stator fixed to the housing being in operable communication with the rotor.

4. The claw pole synchronous machine of claim 3, wherein the housing includes a first end bell on a first axial end, a second end bell on a second axial end opposite the first end bell, and a radially outward yoke connecting the first end bell and the second end bell.

5. The claw pole synchronous machine of claim 4, further comprising a first ferromagnetic plate extending from the first end bell axially toward the second end bell, such that the first magnetic flux path is extended through the first ferromagnetic disk.

6. The claw pole synchronous machine of claim 4, further comprising a second ferromagnetic plate extending axially from the second end bell toward the first end bell, such that the second magnetic flux path is extended through the second ferromagnetic disk.

7. The claw pole synchronous machine of claim 4, wherein the housing further defines a third magnetic flux path passing from the first end bell to the first ferromagnetic disc, from the first ferromagnetic disc to the stator winding, from the stator winding to the second ferromagnetic disc, from the second ferromagnetic disk to the second end bell, and from the second end bell to the first end bell.

8. The claw pole synchronous machine of claim 3, wherein the rotor is characterized by an absence of a coil and an absence of permanent magnets.

9. The claw pole synchronous machine of claim 3, further comprising a stator core disposed within the housing and radially outward of the rotor.

10. The claw pole synchronous machine of claim 9, wherein the stator core is disposed axially between a first DC excitation coil and a second DC excitation coil of said at least two DC excitation coils.

11. The claw pole synchronous machine of claim 3, wherein the rotor is mechanically connected to a shaft.

12. The claw pole synchronous machine of claim 11, wherein the housing is disposed about the shaft, and interfaced with the shaft via at least one bearing assembly such that the housing is static relative to the shaft.

13. The claw pole synchronous machine of claim 3, wherein said plurality of first claw poles and said plurality of second claw poles defines an air gap in a radial spacing between the corresponding pluralities of claw poles.

14. The claw pole synchronous machine of claim 13, wherein a shaft protrudes through said air gap.

15. A method for generating electricity in a synchronous machine comprising:

generating a first DC excitation field using a first DC excitation coil, the first DC excitation coil being stationary relative to a housing;

generating a second DC excitation field using a second DC excitation coil, the second DC excitation field opposing the first DC excitation field, and the second DC excitation coil being stationary relative to the housing; and interfacing a claw pole rotor assembly with the first and second DC excitation fields using a first end bell and a second end bell of a synchronous machine to direct the first and second DC excitation fields to a corresponding rotor disk of the claw pole rotor assembly.

16. The method of claim 15, wherein the first DC excitation coil and the second DC excitation coil are positioned radially outward of the claw pole rotor assembly.

17. The method of claim 15, wherein generating the first excitation field using the first DC excitation coil comprises passing a DC current of a first polarity through the first DC excitation coil, and generating the second excitation field using the second DC excitation coil comprises passing a DC current of a second polarity through the second DC excitation coil, the second polarity being opposite the first polarity.

18. The method of claim 15, wherein using the first end bell and the second end bell of the synchronous machine to direct the first and second DC excitation fields to the corresponding rotor disk of the claw pole rotor assembly further comprises using a first ferromagnetic plate extending axially inward from the first end bell and a second ferromagnetic plate extending axially inward form the second end bell to direct the first and second DC excitation fields.

19. The method of claim 15, wherein the claw pole rotor assembly includes a first rotor disk and a second rotor disk, and wherein the claw pole rotor assembly is characterized by a lack of permanent magnets and a lack of excitation coils.

* * * * *